(12) United States Patent
Holloway et al.

(10) Patent No.: US 6,408,901 B2
(45) Date of Patent: Jun. 25, 2002

(54) ACTUATOR WITH ANTI-PINCH FEATURE AND INTEGRATED POSITION CONTROL

(75) Inventors: John C. Holloway, Cumberland, RI (US); Thomas P. Schregardus, Somerville, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 09/804,731

(22) Filed: Mar. 13, 2001

Related U.S. Application Data

(60) Provisional application No. 60/188,742, filed on Mar. 13, 2000.

(51) Int. Cl.[7] .............................................. B65B 1/04
(52) U.S. Cl. ............. 141/301; 220/86.2; 220/DIG. 33; 251/129.12
(58) Field of Search .......................... 141/301, 347–350; 220/862, DIG. 33; 310/12, 80, 83, 78, 112, 209; 251/129.12, 129.11

(56) References Cited

U.S. PATENT DOCUMENTS

| | | | | |
|---|---|---|---|---|
| 5,052,424 A | * | 10/1991 | Zerndt et al. | |
| 5,875,681 A | * | 3/1999 | Gerrand et al. | |
| 5,910,760 A | | 6/1999 | Malingowski et al. | 335/167 |
| 6,075,298 A | * | 6/2000 | Maue et al. | |
| 6,230,768 B1 | * | 5/2001 | Stapf et al. | |

* cited by examiner

*Primary Examiner*—Steven O. Douglas
(74) *Attorney, Agent, or Firm*—Grossman, Tucker, Perreault & Pfleger, PLLC

(57) ABSTRACT

An electromechanical actuator including an output shaft structure coupled to an output gear to allow relative motion therebetween upon application of a predetermined level of force to the output shaft structure. The relative motion opens a normally closed conductive path between a motor for driving the output gear and a power supply input terminal. Integrated position control is provided whereby the conductive path is opened at limits to the range of motion for the output shaft established by location of the ends of stationary contacts. A fuel filler valve system and a method of providing pinch protection are also provided.

38 Claims, 9 Drawing Sheets

ACTUATOR WITH ANTI-PINCH FEATURE AND INTEGRATED POSITION CONTROL

CROSS-REFERENCE TO RELATED APPLICATIONS

The present application claims the benefit of the filing date of U.S. Provisional Application No. 60/188,742 filed Mar. 13, 2000, the teachings of which are incorporated herein by reference.

FIELD OF THE INVENTION

The present invention relates generally to an electromechanical actuator for driving a mechanism between open and closed positions.

BACKGROUND OF THE INVENTION

Automation of fuel filling has been the subject of interest in the automotive industry. In this regard, automatic fuel filler doors, which automatically open and close to allow access to a vehicle fuel filler, are envisioned. In one design, such a door may include a valve, such as a ball valve, which rotates under the control of an actuator to allow access to the fuel filler port. Importantly, the actuator should reliably rotate the valve from the closed position to the open position to permit fueling the vehicle and then drive the mechanism or valve back to the closed position.

An anti-pinch safety feature may also be required for protecting against a shearing effect created as the valve rotates to close the fuel filler port. For example, absent anti-pinch protection fingers may be injured if inadvertently placed in the port while the door is closing. In addition, system damage may occur, if for example, the door is closed on a gasoline pump nozzle or other robust obstruction.

Unfortunately, merely by limiting the amount of force applied to the valve by the actuator is not a viable solution to the safety hazard associated with closure of the valve. Despite the need to provide safe conditions during closing, it also necessary to close the valve with sufficient force to work with system features such as seals and gaskets that provide resistance or that need to be compressed by the actuator during some portion of the operation. Also, environmental conditions such as temperature extremes, dust, dirt and ice should not cause the unit to become inoperable due to the actuator not generating sufficient closure force. It may also be desirable for the actuator to firmly hold the ball valve against positive stops. For these and other related reasons, it is not viable to provide for safe operation merely by using a low force actuator.

Accordingly, there is a need in the art for an actuator that provides an efficient and reliable anti-pinch protection that interrupts normal operation under certain load conditions. There is a further need in the art for an actuator that safely and reliably closes a valve mechanism for an automotive fuel filler port.

SUMMARY OF THE INVENTION

An electromechanical actuator consistent with the invention includes an electric motor and a conductive path normally connecting the motor for receiving a power supply input. An output gear is coupled to an output shaft of the motor, and an output shaft structure is coupled to the output gear to allow relative motion between the output shaft structure and the output gear upon application of a predetermined level of force to the output shaft structure. The relative motion between the output gear and the output shaft structure opens the conductive path. Integrated position control is provided by configuration of stationary contacts whereby the conductive path is opened at limits to the range of motion for the output shaft established by location of the ends of the stationary contacts.

A fuel filler valve system consistent with the invention includes a valve disposed between a vehicle fuel filler port and a vehicle fuel tank, and an actuator consistent with the invention for moving the valve between the open and closed positions. A method of providing pinch protection in a movable mechanism consistent with the invention includes coupling the mechanism to an actuator consistent with the invention, and energizing the actuator motor to drive the mechanism.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
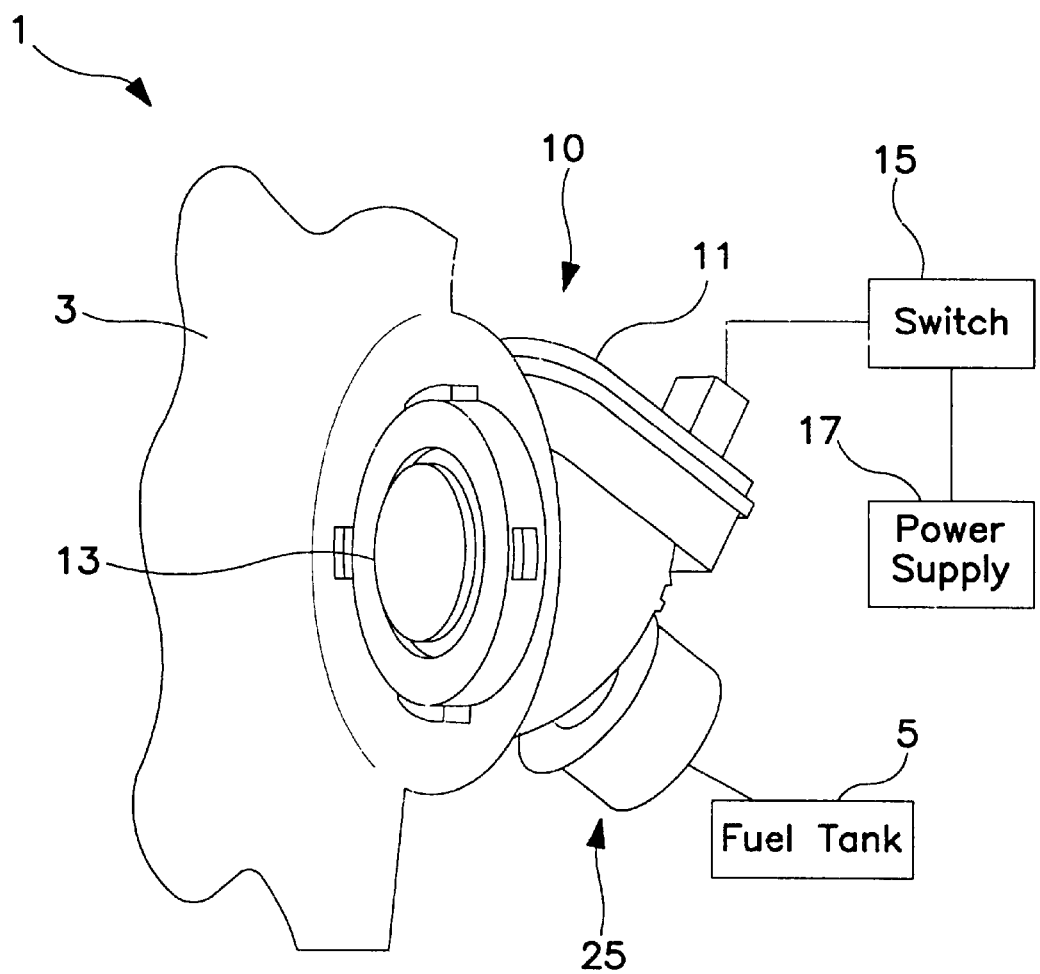
FIG. 1 is a perspective cut-away view of an exemplary fuel filler system consistent with the invention.

Referring to FIG. 1, there is illustrated an exemplary automotive fuel filling system 1 including a valve assembly 25 and an actuator 10 consistent with the present invention. Although the present invention will be described in connection with a specific embodiment of a fuel filling system, those skilled in the art will recognize other system configurations where an actuator consistent with the present invention may be utilized. It is to be understood, therefore, that the embodiments described herein are described by way of illustration, not of limitation.

In general, the valve assembly 25 may be mounted to a vehicle 3 for controlling access to the vehicle fuel tank 5. In the illustrated embodiment, the actuator 10 reliably and safely drives a ball valve 13 of the valve assembly 25 between open and closed positions. When the valve 13 is in an open position, access to the fuel tank is permitted, allowing a user to fill the tank. When the valve is in a closed position, the valve securely closes the passageway to the fuel tank. Operation of the actuator to achieve an open or closed valve position may be controlled via a switch 15, e.g. in the vehicle passenger compartment, which controls connection of a power supply 17, e.g. the vehicle battery, to the actuator.

Figure 2:
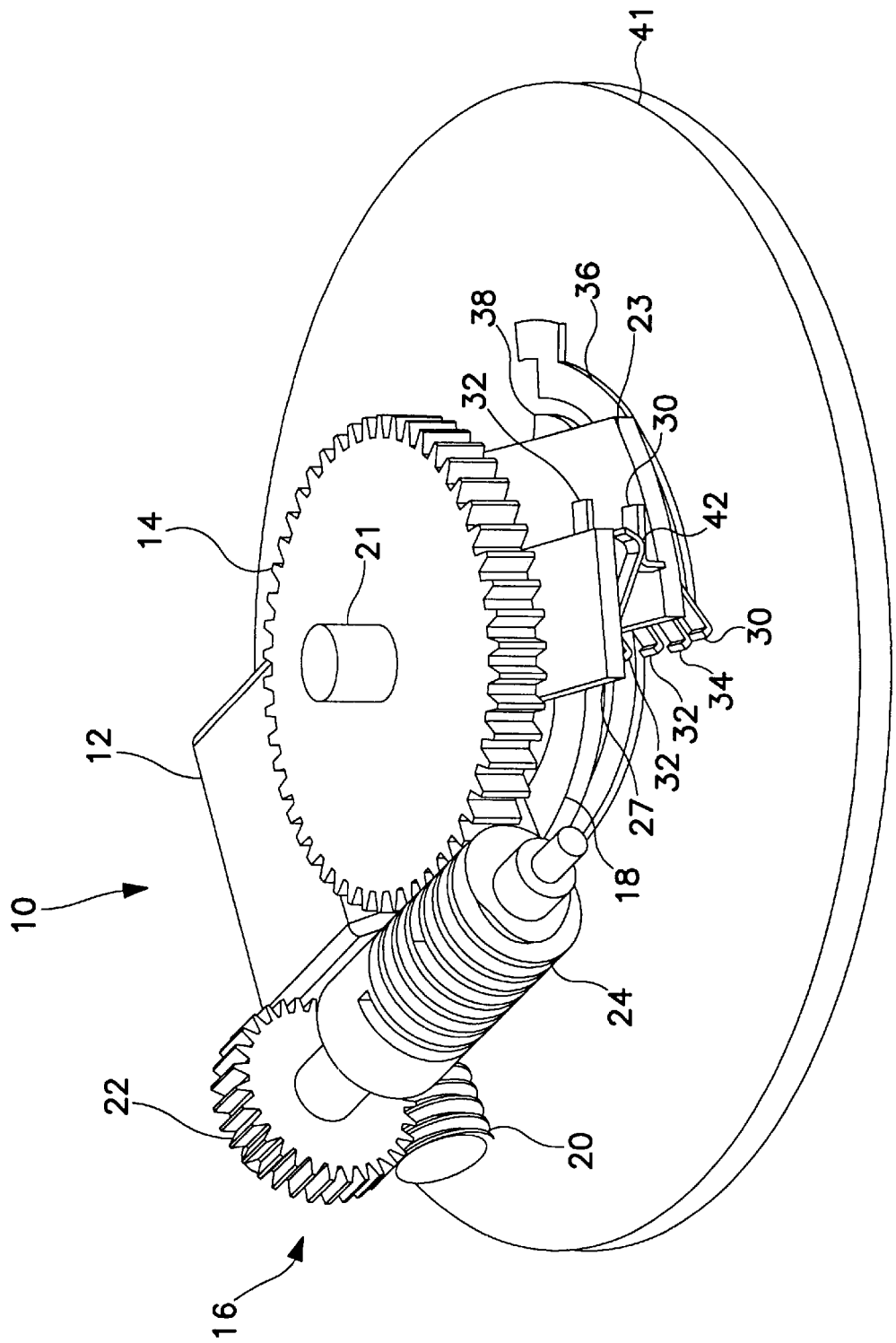
FIG. 2 is a perspective view of an exemplary actuator consistent with the present invention.
Figure 3:
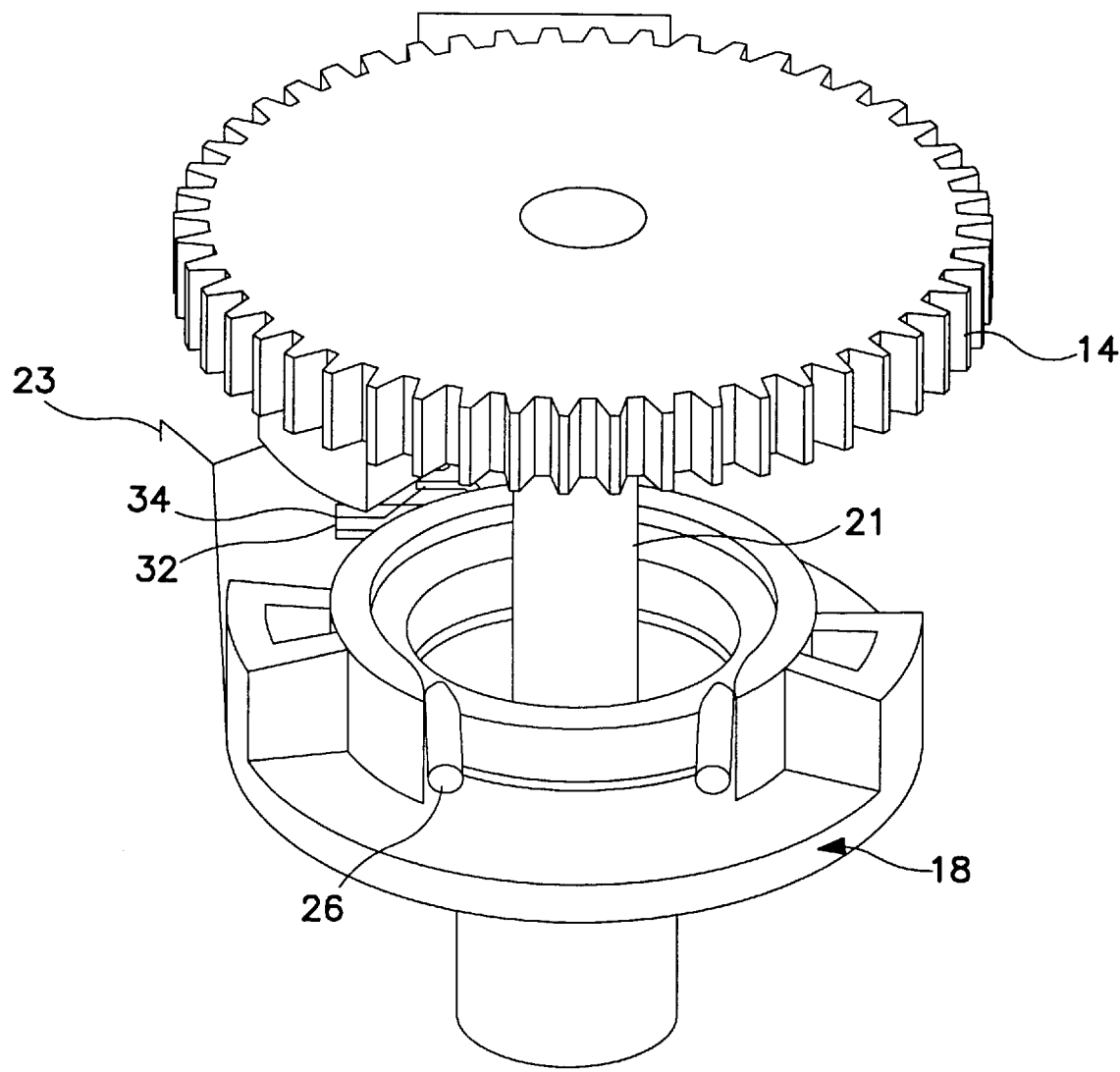
FIG. 3 is a partially exploded view of an exemplary output gear and output shaft structure portion of an actuator consistent with the invention.
Figure 4:
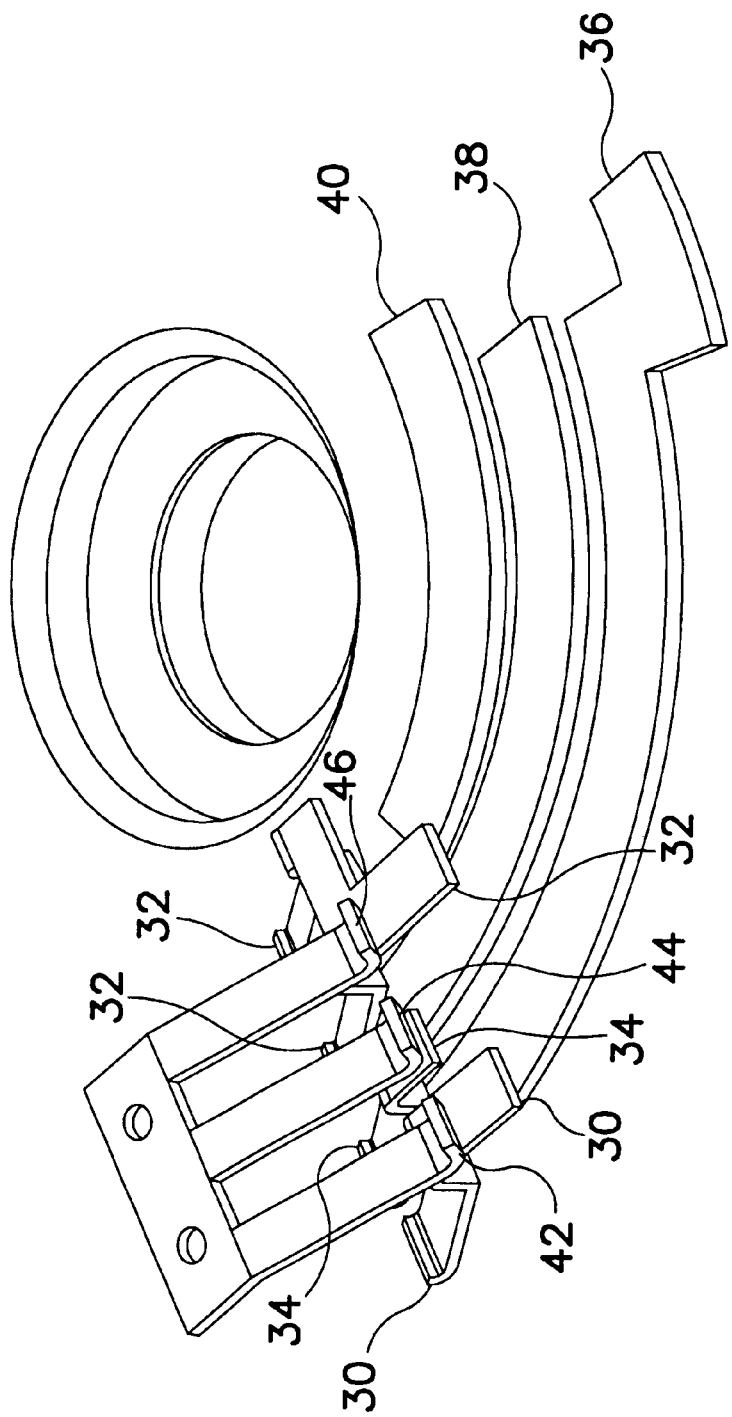
FIG. 4 is a perspective view of the wipers and stationary contacts of the actuator assembly shown in FIG. 1.

Referring to FIGS. 2 through 4, an exemplary embodiment of an actuator 10 consistent with the invention is illustrated. Those skilled in the art will recognize that the actuator 10 may be disposed within a housing 11, as shown in FIG. 1. In FIGS. 2–4, only a bottom portion 41 of the housing is shown to allow for simplicity and ease of explanation.

As shown, the actuator 10 may include a motor 12 that drives an output gear 14 through a gear train 16. Those skilled in the art will recognize that a wide variety of gear trains 16 may be used to drive the output gear 14. In the illustrated exemplary embodiment, however, the gear train includes a motor worm gear 20, a spur gear 22 and a worm gear 24 in meshing engagement with the output gear 14.

With particular reference to FIG. 3, a pinch protection feature may be accomplished through relative motion between the output gear 14 and an output shaft structure 18 that is coupled to the valve assembly 25 for driving the valve 13 between open and closed positions. Generally, in a pinch protection condition an obstruction to closure of the valve 13 imparts a force to the output shaft structure 18 that causes relative motion between the structure and the gear 14. This relative motion breaks a normally closed electrical connection between the power supply 17 and the motor 12 to disconnect the motor from the power supply 17 and stop the actuator.

In the illustrated embodiment, the output gear 14 is coupled via a shaft 21 to the output shaft structure 18 so that the two parts 14 and 18 are coaxial. The gear 14 and shaft structure 18 are biased against each other through use of a torsion spring 26. The spring 26 may be installed between the output gear 14 and the output shaft structure 18 with a specific preloaded force.

In one embodiment output shaft electrical contacts or wipers 30, 32, 34 may be attached to a radial extension 23 of the output shaft structure 18, and a corresponding set of output gear contacts or wipers 42, 44, 46, may be attached to a radial extension 27 the output gear. The wipers 30, 32, 34 move in tandem with the output shaft structure 18 at all times. The output shaft wipers 30, 32, 34 and the output gear wipers 42, 44, 46 interact with each other as well as with stationary contacts, e.g. contacts 36, 38, 40 in FIG. 4 that are fixed to the bottom 41 of the housing 11. The wipers may be spring temper stampings. In the embodiment illustrated in FIGS. 2–4, the wipers 30, 32, 34 and 42, 44, 46 are normally in contact, as shown in FIG. 4, but separate upon relative motion between the output gear 14 and the output shaft structure 18 to open an electrical path between the power supply and the motor, as will be described in more detail below.

Figure 5:
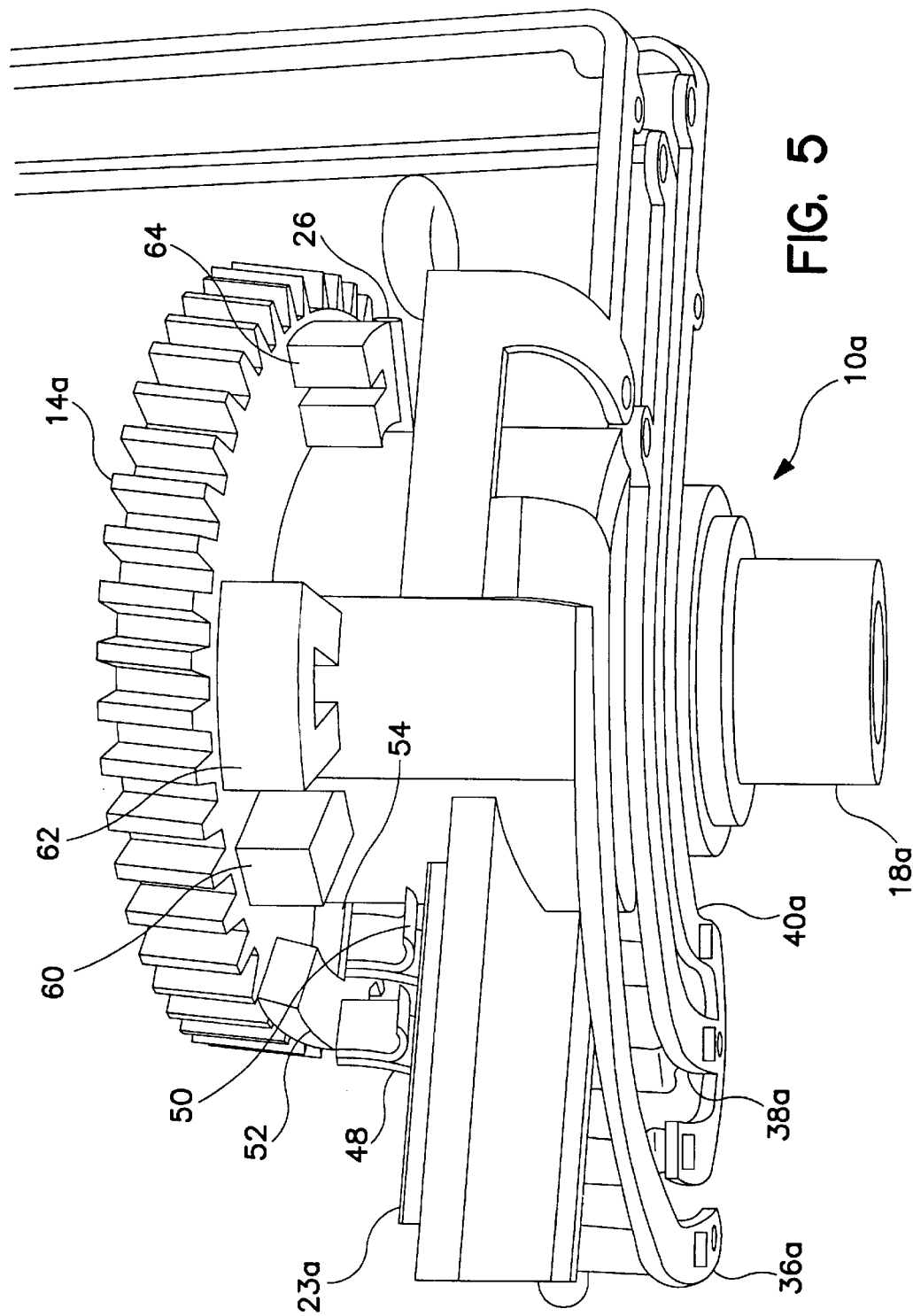
FIG. 5 is a perspective view of another embodiment of an actuator consistent with the invention.

In another embodiment 10a illustrated in FIG. 5, opening and closing of the motor/power supply connection is achieved by relative motion of the output gear 14a and the output shaft structure 18a, except the wipers 42, 44, 46 are not provided on the output gear 14a. Instead, cam contacts or wipers 48, 50 may be provided on the extension 23a of output shaft structure 18a. In the embodiment illustrated in FIG. 5, the wipers 48, 50 and 30, 32, 34 are moved into and out of contact with each other by engagement and disengagement of the wipers 48,50 with cam lobes 52, 54 on the output gear 14a.

More particularly, when the actuator is driving a mechanism, e.g. the valve 13, from an open to a closed position, the gear train 16 drives the output gear 14a, which transmits torque to the output shaft structure 18a through the torsion spring 26. Under normal operating conditions, the output shaft structure 18a is free to turn with less torque than that required to overcome the preloaded force of the torsion spring 26. The output gear 14a and output shaft structure 18a thus behave as one piece, and the cam lobes 52, 54 force the wipers 48, 52 into contact with the wipers 30, 32, 34 on extension 23a. It is intended that the normal operating torque for the valve 13 be below the torque provided by the preloaded spring 26 so that the system will behave as described under ordinary circumstances.

If the valve encounters an obstruction when being closed (such as a finger or fuel filler nozzle), then the output shaft structure 18a may stop rotating. Since the motor 12 may still be providing power through the gear train 16, the output gear 14a may continue to move. This may result in relative motion between the output gear 14a and the output shaft structure 18a and corresponding deflection of the torsion spring 26. Calibration of this pinch protection trip point may be achieved by varying the designed force characteristics of the spring.

As the output gear 14a rotates relative to the output shaft structure 18a, it also rotates relative to the wipers 48, 50 disposed on the output shaft structure 18a. As the output gear 14a progresses through this relative rotation, the cam lobes 52, 54 on the face of the output gear move relative to the wipers 48,50. These cam lobes 52, 54 are shaped and positioned in such a manner as to predictably release the wipers allowing them to spring apart from the wipers 30, 32, 34 on extension 23a that they were being held in contact with. The motor connection circuit is arranged in such way that if the system is in a "Pinch Protection Zone" this separation of the wipers interrupts the supply of electrical power to the motor 12 and the output gear 14a will cease to rotate. As long as the obstruction remains, this relationship may be maintained because the output gear 14a may be driven by a worm drive that has a small lead angle so that it is resistant to being back-driven by the spring.

When the obstruction is removed, the spring 26 may release stored energy and drive the output shaft structure 18a relative to the output gear 14a. The output shaft structure 18a may align with the output gear 14a, and the ordinary and usual relationship between the parts may then be restored. When this occurs, the cam lobes 52, 54 on the output gear may have moved back into proximity with the wipers 48, 50 respectively, and the wipers 48, 50 and 30, 32, 34 may once again be held in contact with each other. This action restores the supply of electrical power to the motor and the actuator may resume closing the mechanism.

Figure 6:
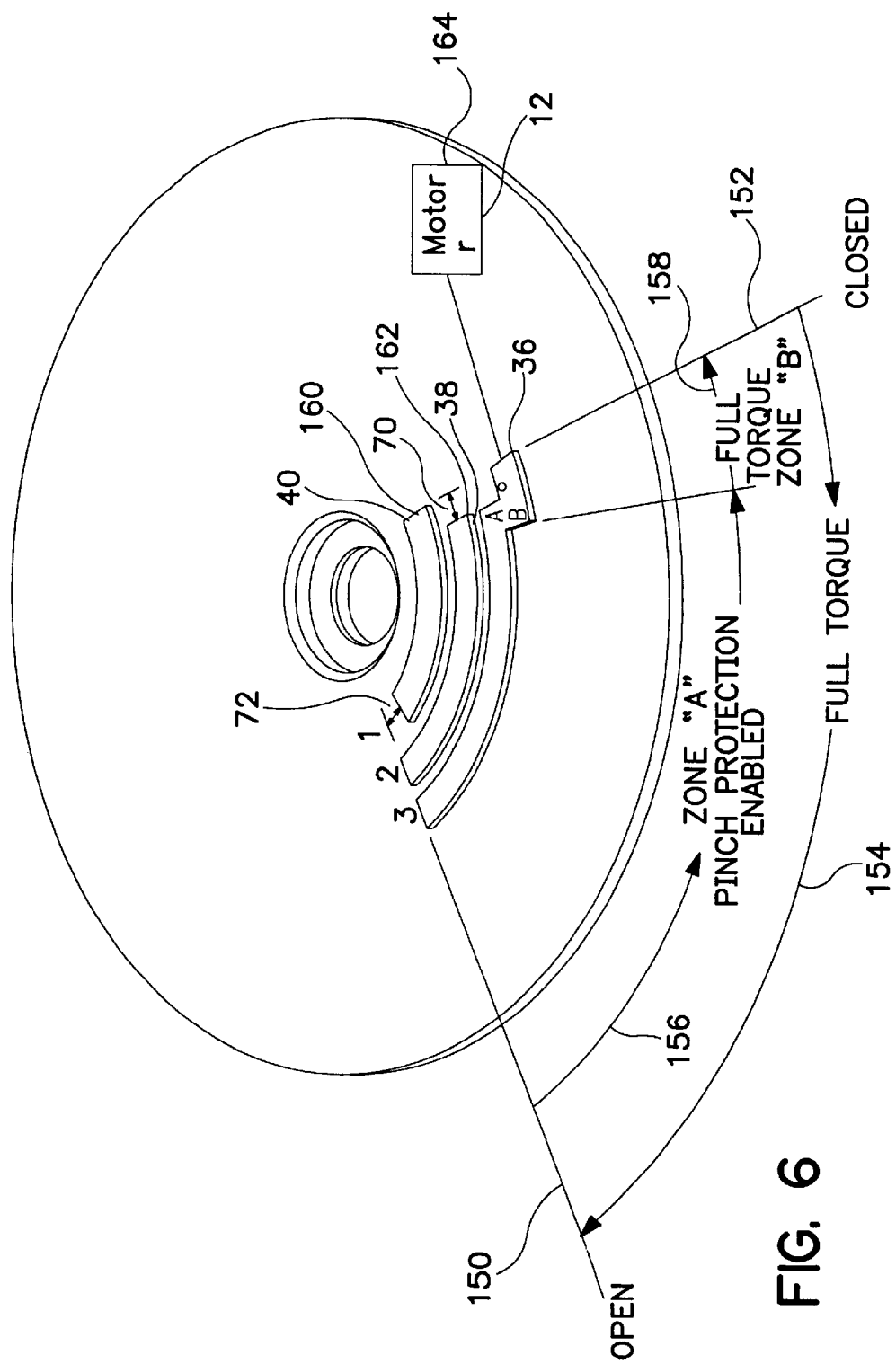
FIGS. 6–8 are plan views of alternative exemplary stationary contact arrangements for an actuator consistent with the invention.
Figure 7:
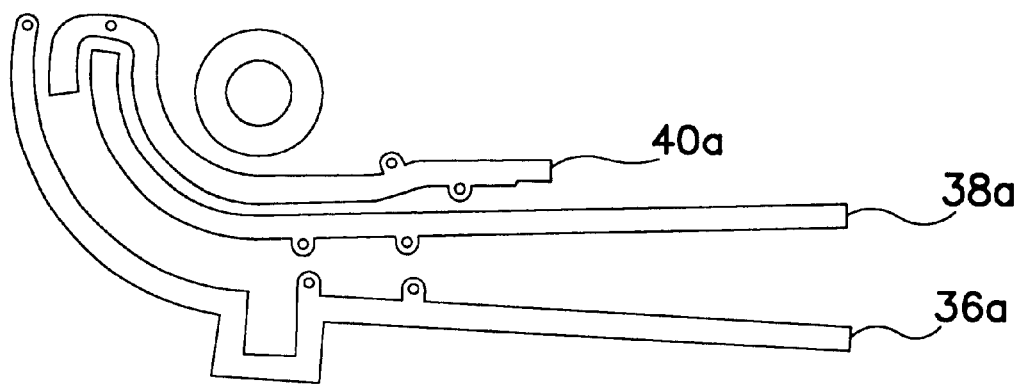
Figure 8:
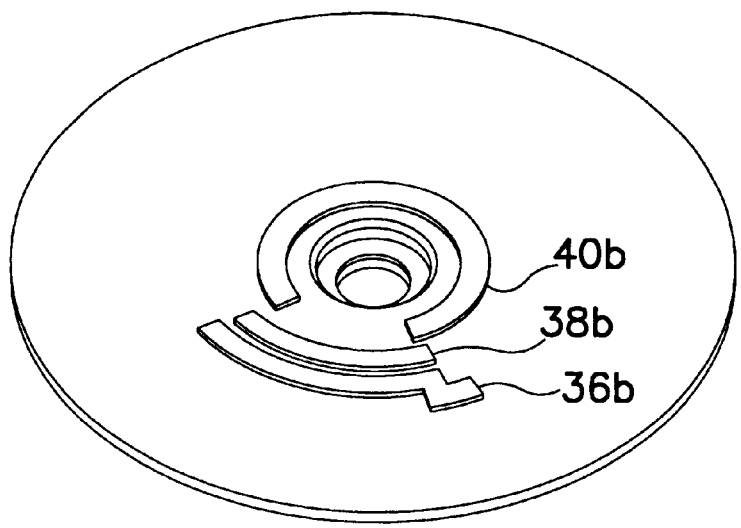

The arrangement of the stationary electrical contacts on the housing may vary. Exemplary arrangements are illustrated in FIGS. 6–8. The range of motion defining the operational zones, e.g. the "Pinch Protection Zone", for the actuator may vary depending on the specific configuration of the stationary contacts. It may be desirable, however, to have the pinch protection scheme employed in the range of motion where an object could become trapped between an edge of the opening in the stationary valve housing and an opposing edge in the moving portion of the valve mechanism.

With reference to the exemplary embodiment illustrated in FIG. 6, for example, the wipers 30, 32, 34 may travel relative to the stationary contacts 36, 38, 40 between an open position indicated by line 150 and a closed position indicated by line 152. When traveling from a closed to an open position as indicated by arrow 154, the stationary contacts 36, 38, 40 are maintained in contact with the wipers 30, 32, 34 to ensure full torque from the motor.

However, when traveling from an open position to a closed position as indicated by arrows 156 and 158 pinch protection may be enabled in a first zone referred to as zone A. In this zone relative motion between the output gear 14, 14a and the output shaft structure, 18, 18a, disconnects the motor from the power supply to provide pinch protection. Once the closing valve has gone beyond the region where it presents an opening where an object could become trapped, it may no longer be desirable to have active pinch protection. In fact, it may be desirable to have the full power of the system available to provide power for compression of seals, driving the system firmly against fixed stops or for other system needs. The invention may accommodate this need by providing a second zone, i.e. zone B, where the pinch protection feature is disabled.

When the wipers 30, 32, 34 are positioned on the stationary contacts in zone B. if the output shaft encounters high resistance torque (torque greater than that available form the preloaded torsion spring), e.g. from seals, hard stops, etc., the output gear 14a may begin to rotate relative to the output shaft structure 18a, just as in the preceding description of the pinch protection feature. However, within zone B, the arrangement of the stationary contacts 36, 38, 40 differs so that even though the wipers 48,50 spring apart and loose contact with each other, electrical power to the motor is not interrupted. This results in the motor continuing to drive the system.

The output gear 14a may continue to rotate relative to the output shaft structure 18a and deflect the torsion spring 26 until it reaches a rigid interface point with the output shaft, e.g. until a rigid stop 62 on the output shaft structure 18a contacts a rigid stop 60 or 64 on the output gear 14a. At this point, the output gear 14a may no longer be transmitting torque to the output shaft structure 18 through the spring 26, but may be transmitting torque to the structure 18 through the rigid interface. The result is that the full power of the motor (less gear train inefficiency, of course) is delivered to the output shaft structure 18a and subsequently, the mechanism or valve.

The output may resume rotating as long as the obstruction is unable to resist the torque that is now being delivered directly to the output shaft structure 18a (not through the spring). When the output shaft 14a reaches the desired closed position, electrical power to the motor 12 will be interrupted by a gap, e.g. gap 70, or other transition in the stationary contacts. When the wiper enters this gap or transition area, electrical power to the motor is interrupted and the rotation of the system stops.

When the actuator is driving the mechanism from the closed to the open position, the motor 12 and gear train 16 may drive the output gear 14a. The output gear 14a transmits torque to the output shaft structure 18a through the pre-loaded torsion spring 26. The pre-load torque of the spring 26 will cause the output gear 14a and the output shaft structure 18a to behave in tandem or as if they were one piece. This remains true so long as the torque required to rotate the output shaft structure (and the mechanism that it is attached to) remains below the preloaded torque of the spring.

If the mechanism encounters rotational resistance higher than the preloaded torque of the spring, then relative motion will occur between the output gear and shaft, just as with operation in the closing direction. Also, as is the case with the operation in the closing direction, the relative motion is limited to a defined distance by contact of the output gear with a rigid interface 62 on the output shaft structure. This defeats the spring and causes the gear to act directly upon the shaft. For the opening direction, the cam lobes 52,54 are shaped so that the wipers 48,50 and wipers 30,32,34 remain held in contact with each other so that electrical power to the motor is not interrupted and the actuator will continue to drive the mechanism.

The spring feature is utilized in the opening direction primarily as a shock absorber to cushion the gear train 16 from loads that would occur by any abrupt obstruction of the output shaft or from reaching an end-of-travel stop. When the ball reaches the end-of-travel stop (the fully open position) the output shaft structure 18a will not be able to continue rotating. The motor will have shut down because, just as in the other direction, there will be a gap, e.g. gap 72, or other transition in the stationary contacts that the wiper will ride into, breaking electrical continuity to the motor. The spring 26 will absorb any remaining energy ("coast") due to inertia of the moving system.

Control of the actuator in its operational zones is thus accomplished through internal switching. The control switches allow the actuator to complete its last command. For example, if the pinch protection feature is activated, the obstruction that caused it can remain in place indefinitely without causing damage to the motor since the pinch protection mechanism breaks the electrical circuit. Due to the spring 26, the mechanism will reset automatically when the obstruction is removed and the actuator will complete its instruction to close the valve. This instruction may be provided by selectively supplying electrical power, e.g. through switch 15, to the stationary contacts through an electrical connector that is part of the actuator.

Figure 9:
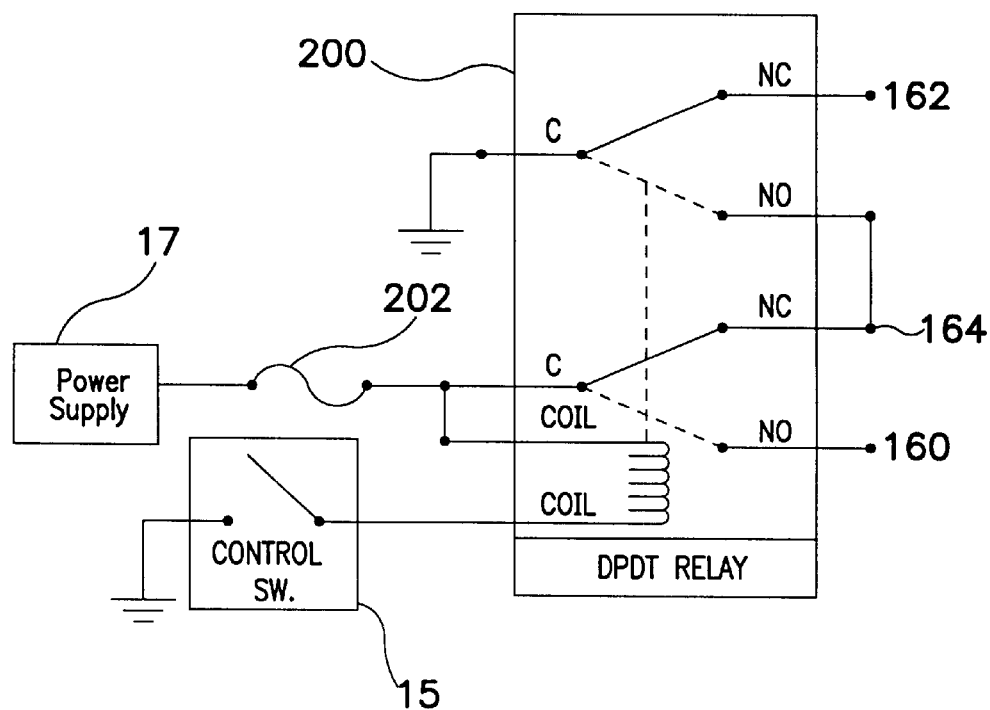
FIG. 9 illustrates an exemplary operator control switching scheme for an actuator consistent with the invention.

Turning now to FIG. 9, an operator control switching scheme is illustrated. In the illustrated embodiment, the actuator may be energized to open or close using a double-pole/double through (DPDT) relay 200. The relay facilitates connection of the power supply 17, e.g. 12 VDC, through a fuse 202 to contact points 160, 162, and 164 depending on the position of the control switch 15. The connections established by the relay 200 as a function of the switch position may be as set forth in Table 1 below:

TABLE 1

|  | Open Door | Close Door |
| --- | --- | --- |
| Control Switch 15 | Closed | Open |
| Contact 160 | 12 VDC | Open |
| Contact 162 | Open | Ground |
| Contact 164 | Ground | 12 VDC |

The contact points 160, and 162 are electrically connected to stationary contacts 40, 38, as shown in FIG. 6, and contact 164 is electrically connected to a first motor input terminal with the other motor terminal connected to stationary contact 36. In normal mode, the output shaft and output gear structure rotate together, and the power supply is connected across the motor 12 through wipers 30, 32, 34 and wipers 48, 50, which connect either stationary contact 40 (and contact 160) to stationary contact 36 in the opening direction, or stationary contact 38 (and contact 162) to stationary contact 36 in the closing direction.

In the closing direction, when an obstruction prevents the mechanism from closing, the output shaft structure 18a stops rotating, the drive gear continues to move, and the cams 52, 54 release the wipers 48, 50 from the wipers 30, 32, 34. This may cause one of two events. In the pinch protection zone, continuity between contact 38 (and 162) and 36 is interrupted. The motor stops until the obstruction is removed. When the obstruction is removed, alignment between the output gear 14a and the output shaft structure 18a is restored by the spring 26, and normal function returns. Beyond the pinch protection zone continuity is maintained between contacts 38 and 36 and the actuator drives to the closed position.

Similar operation may be achieved using the alternative stationary contact configurations illustrated in FIGS. 7 and 8. In those configurations, the wipers 30, 32, 34 engage/disengage associated stationary contacts to achieve the above-stated functions. Those skilled in the art will recognize that a variety of stationary contact and wiper configurations may be utilized in an actuator consistent with the invention. It is to be understood, therefore, that the exemplary configurations provided herein are provided by way of illustration, but not of limitation.

Consistent with the invention, therefore, the stationary contacts define the limits of the open and closed positions, and the actuator stops when these positions are reached. This is significant because it prevents motor degradation that would occur more quickly if the actuator were driven to stall every time. In the absence of this feature, control would have to be more sophisticated with a timed source of current. Also, driving the system to a hard internal stop every time would increase fatigue on the gear train. Current draw would be higher when the motor stalled.

A manual override may also be provided to account for actuator failure or electrical power loss. This feature may allow the actuator to be manually driven to open the valve allowing for fuel delivery. The manual override may also facilitate manual closure of the valve, but the preferred action upon actuator failure with the valve in the open position may be replacement of the system. Advantageously, the manual override may be designed so that the actuator can "self heal" when re-powered by back-driving (rotating in reverse) itself and dropping into mounting detents at the completion of cycle.

Figure 10:
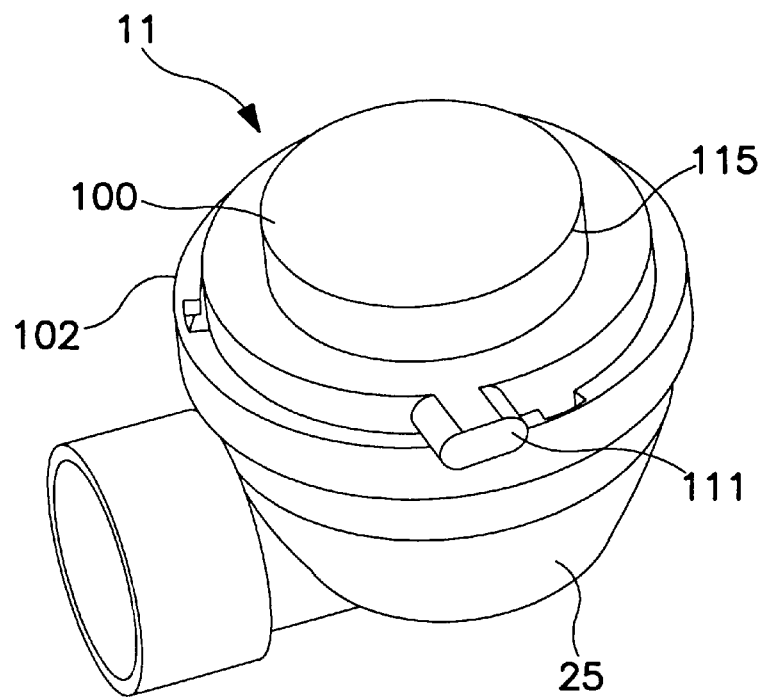
FIG. 10 is a perspective view illustrating an exemplary mounting arrangement for an actuator consistent with the invention relative to a ball valve assembly wherein the actuator is mounted for manual override.
Figure 11:
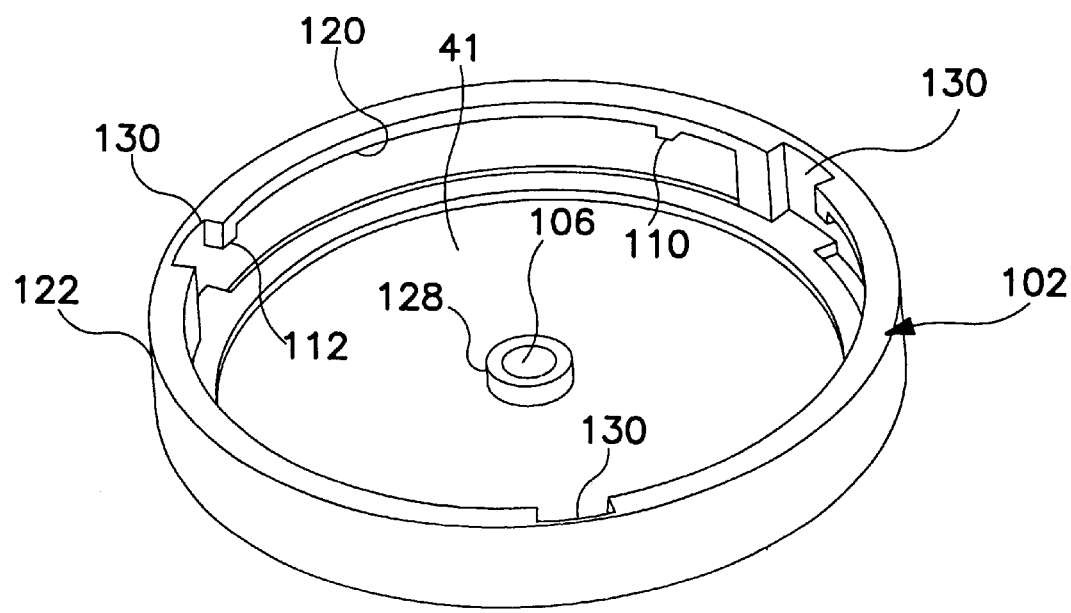
FIG. 11 is a perspective view of the exemplary manual override cap illustrated in FIG. 10.
Figure 12:
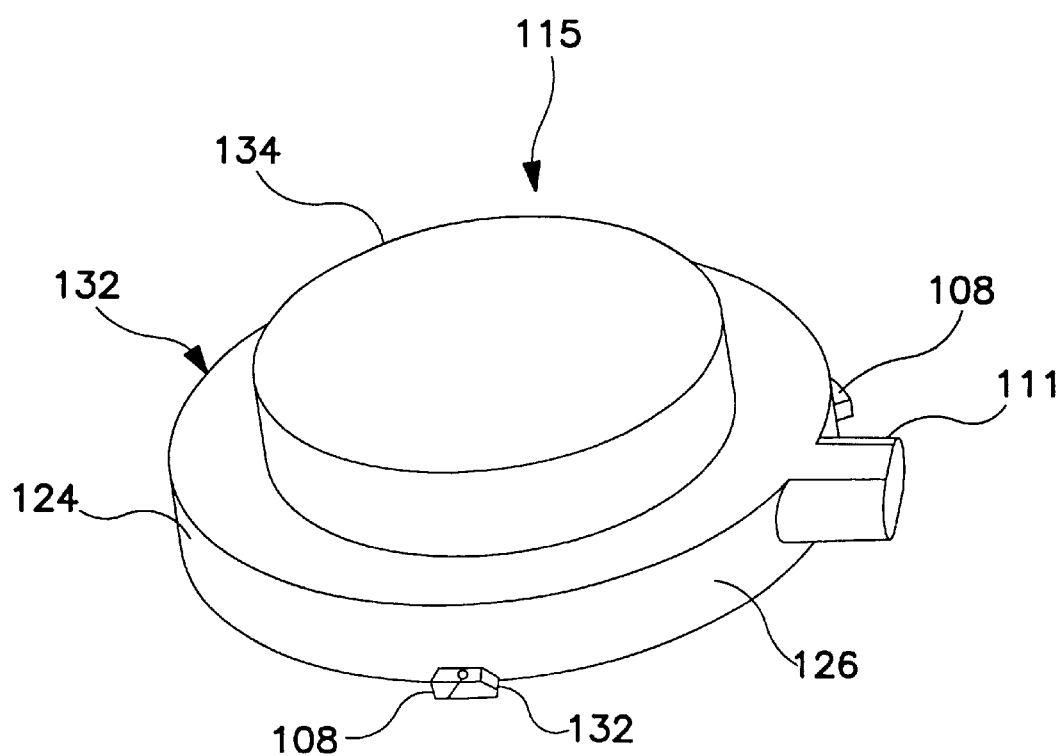
FIG. 12 is a perspective view of the exemplary top housing portion illustrated in FIG. 10.

An exemplary manual override arrangement is illustrated in FIGS. 10–12. As shown in FIG. 10, the actuator housing 11 may include a top housing portion 115 and a bottom manual override cap 102 secured to the valve assembly 25. The cap 102 is illustrated more particularly in FIG. 11. In the illustrated embodiment, the cap generally includes the circular bottom panel portion 41 and an axially extending perimeter sidewall 122. The bottom portion includes portions 128 defining an aperture through which an input shaft of the ball valve assembly 25 may extend for coupling to the actuator output shaft structure 18, 18a. The sidewall includes key slots for receiving associated locking tabs 108 on the top portion 115.

As shown in FIG. 12, the top housing portion 115 may include a first large diameter cylindrical portion 132 with a concentric small diameter cylindrical portion 134 disposed thereon. The large diameter cylindrical portion 132 may include a sidewall 120 with the locking tabs 108 extending radially from an exterior surface 124 thereof. The tabs 108 may be generally rectangular in shape with a chamfered forward edge 132. The top portion 115 may be concentrically and rotatably arranged relative to the cap 102, with the interior surface 120 of the cap side-wall 122 disposed adjacent to the exterior surface 124 of the top portion side wall 126 as shown in FIG. 10.

In normal operating mode, a locking tab 108 on the actuator housing engages a corresponding retention ramp 110 on the cap to prevent rotation of the top portion 115 relative to the cap 102. In manual override mode, however, the top portion 115 may be manually rotated, e.g. by operation of an override cable accessible through the vehicle trunk or passenger compartment and connected to an override arm extending from the top portion 115 of the housing. Rotation of the top portion causes sufficient rotation of the output shaft to open the valve. Rotation of the top portion during manual override is arrested by engagement of the locking tab 108 with a manual override position stop 112. Advantageously, due to the bias force established by the spring 26 the mechanical override self-heals by returning to the normal position upon energization of the actuator following a mechanical override.

In an actuator consistent with the invention, therefore, pinch protection is enabled in a simple and efficient manner. Other methods that are sometimes employed are more elaborate solutions using, for example, electronic sensors that can detect the presence of objects. The present invention, however, employs a method that is simple and cost effective and accomplished through electromechanical means rather than with electronics. This translates lower cost through less expensive components and simplified assembly and test.

Also, since the actuator moves to an open or closed position and then turns itself off, automatic control is facilitated in an efficient manner. This means that the actuator could, for example, be electrically connected to a vehicle park interlock so that the fuel door will automatically close upon placing the vehicle in gear. The actuator could also be configured so that the ignition had to be off to permit opening. Essentially, the automated control allows the control of the actuator based on a variety of conditions and inputs.

The invention has applicability beyond the scope of fuel filler access. This system may find utility in the operation of any valve. In fact, the actuator would find utility in any device requiring movement of a mechanism while providing an anti-pinch feature that is active throughout the full range of motion of the actuator or within a specific range of the motion. Further, by converting the rotating members of the design to a "sled" assembly, a linear version could be made that employs these same unique features.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An electromechanical actuator, comprising:
   an electric motor;
   a conductive path normally connecting said motor for receiving a power supply input;
   an output gear coupled to an output shaft of said motor;
   an output shaft structure coupled to said output gear to allow relative motion between said output shaft structure and said output gear upon application of a predetermined level of force to said output shaft structure, said relative motion opening said conductive path; and
   a spring disposed between said output gear and said output shaft structure, said spring being configured to deflect for permitting said relative motion upon application of said predetermined level of force.

2. An actuator according to claim 1, wherein said output gear and said output shaft structure are coaxially coupled.

3. An actuator according to claim 1, wherein said output gear is coupled to said output shaft of said motor through a gear train.

4. A system according to claim 3, wherein said gear train comprises a motor worm gear coupled to said motor output shaft and in meshing engagement with a spur gear, said spur gear being coaxially coupled to a second worm gear in meshing engagement with said output gear.

5. An actuator according to claim 1, wherein said conductive path comprises at least one output gear contact coupled to said output gear, said output gear contact being normally electrically connected to at least one output shaft contact coupled to said output shaft structure, said output gear contact and said output shaft contact being configured to disengage from each other in response to said relative motion thereby open said electrical path.

6. An actuator according to claim 5, wherein said actuator further comprises at least one stationary contact for engaging said output shaft contact in a range of motion of said output shaft structure.

7. An actuator according to claim 6, wherein movement of said output shaft contact beyond an end of said at least one stationary contact opens and conductive path to define a limit to said range of motion.

8. An actuator according to claim 5, wherein said actuator comprises a first stationary contact for engaging a first one of said output shaft contacts in a first direction of rotation of said output shaft, and a second stationary contact for engaging a second one of said output shaft contacts in a second direction of rotation of said output shaft, and wherein movement of said first output shaft contact beyond an end of said first stationary contact opens said conductive path to define a limit of rotation of said output shaft in said first direction, and wherein movement of said second output shaft contact beyond an end of said second stationary contact opens said conductive path to define a limit of rotation of said output shaft in said second direction.

9. An actuator according to claim 1, wherein said conductive path comprises at least one cam contact and at least one output shaft contact coupled to said output shaft structure, and wherein said output gear comprises at least one cam for depressing cam contact onto said output shaft contact, said cam being configured to release said cam contact from engagement with said output shaft contact in response to said relative motion to thereby open said electrical path.

10. An actuator according to claim 9, wherein said actuator further comprises at least one stationary contact for engaging said output shaft contact in a range of motion of said output shaft structure.

11. An actuator according to claim 10, wherein movement of said output shaft contact beyond an end of said at least one stationary contact opens said conductive path to define a limit to said range of motion.

12. An actuator according to claim 9, wherein said actuator comprises a first stationary contact for engaging a first one of said output shaft contacts in a first direction of rotation of said output shaft, and a second stationary contact for engaging a second one of said output shaft contacts in a second direction of rotation of said output shaft, and wherein movement of said first output shaft contact beyond an end of said first stationary contact opens said conductive path to define a limit of rotation of said output shaft in said first direction, and wherein movement of said second output shaft contact beyond an end of said second stationary contact opens said conductive path to define a limit of rotation of said output shaft in said second direction.

13. An actuator according to claim 1 said actuator further comprising a housing, said housing comprising a top portion disposed at least partially within a cap portion and rotatable relative to said cap portion, wherein said motor, said output gear, and said output shaft are coupled to said top portion for rotation upon manual rotation of said top portion relative to said cap portion.

14. An electromechanical actuator, comprising:
an electric motor;
a conductive path normally connecting said motor for receiving a power supply input;
an output gear coupled to an output shaft of said motor; and
an output shaft structure coupled to said output gear to allow relative motion between said output shaft structure and said output gear upon application of a predetermined level of force to said output shaft structure, said relative motion opening said conductive path, wherein said conductive path comprises at least one output gear contact coupled to said output gear, said output gear contact being normally electrically connected to at least one output shaft contact coupled to said output shaft structure, said output gear contact and said output shaft contact being configured to disengage from each other in response to said relative motion to thereby open said electrical path.

15. An actuator according to claim 14, wherein said actuator further comprises at least one stationary contact for engaging said output shaft contact in a range of motion of said output shaft structure.

16. An actuator according to claim 15, wherein movement of said output shaft contact beyond an end of said at least one stationary contact opens said conductive path to define a limit to said range of motion.

17. An actuator according to claim 14, wherein said actuator comprises a first stationary contact for engaging a first one of said output shaft contacts in a first direction of rotation of said output shaft, and a second stationary contact for engaging a second one of said output shaft contacts in a second direction of rotation of said output shaft, and wherein movement of said first output shaft contact beyond an end of said first stationary contact opens said conductive path to define a limit of rotation of said output shaft in said first direction, and wherein movement of said second output shaft contact beyond an end of said second stationary contact opens said conductive path to define a limit of rotation of said output shaft in said second direction.

18. An electromechanical actuator, comprising:
an electric motor;
a conductive path normally connecting said motor for receiving a power supply input;
an output gear coupled to an output shaft of said motor; and
an output shaft structure coupled to said output gear to allow relative motion between said output shaft structure and said output gear upon application of a predetermined level of force to said output shaft structure, said relative motion opening said conductive path, wherein said conductive path comprises at least one cam contact and at least one output shaft contact coupled to said output shaft structure, and wherein said output gear comprises at least one cam for depressing said cam contact onto said output shaft contact, said cam being configured to release said cam contact from engagement with said output shaft contact in response to said relative motion to thereby open said electrical path.

19. An actuator according to claim 18, wherein said actuator further comprises at least one stationary contact for engaging said output shaft contact in a range of motion of said output shaft structure.

20. An actuator according to claim 11, wherein movement of said output shaft contact beyond an end of said at least one stationary contact opens said conductive path to define a limit to said range of motion.

21. An actuator according to claim 18, wherein said actuator comprises a first stationary contact for engaging a first one of said output shaft contacts in a first direction of rotation of said output shaft, and a second stationary contact for engaging a second one of said output shaft contacts in a second direction of rotation of said output shaft, and wherein movement of said first output shaft contact beyond an end of said first stationary contact opens said conductive path to define a limit of rotation of said output shaft in said first direction, and wherein movement of said second output shaft contact beyond an end of said second stationary contact opens said conductive path to define a limit of rotation of said output shaft in said second direction.

22. An electromechanical actuator, comprising:
   an electric motor;
   a conductive path normally connecting said motor for receiving a power supply input;
   an output gear coupled to an output shaft of said motor;
   an output shaft structure coupled to said output gear to allow relative motion between said output shaft structure and said output gear upon application of a predetermined level of force to said output shaft structure, said relative motion opening said conductive path; and
   a housing, said housing comprising a top portion disposed at least partially within a cap portion and rotatable relative to said cap portion, wherein said motor, said output gear, and said output shaft are coupled to said top portion for rotation upon manual rotation of said top portion relative to said cap portion.

23. A fuel filler valve system comprising:
   a valve disposed between a vehicle fuel filler port and a vehicle fuel tank, said valve having an open and closed position; and
   an electromechanical actuator for moving said valve between said open and closed positions, said actuator comprising:
      an electric motor;
      a conductive path normally connecting said motor for receiving a power supply input;
      an output gear coupled to an output shaft of said motor; and
      an output shaft structure, said output shaft structure having a first end coupled to said valve and a second end coupled to said output gear to allow relative motion between said output shaft structure and said output gear upon application of a predetermined level of force to said valve, said relative motion opening said conductive path.

24. A system according to claim 23, wherein said output gear and said output shaft structure are coaxially coupled.

25. A system according to claim 23, wherein said output gear is coupled to said output shaft of said motor through a gear train.

26. A system according to claim 25, wherein said gear train comprises a motor worm gear coupled to said motor output shaft and in meshing engagement with a spur gear, said spur gear being coaxially coupled to a second worm gear in meshing engagement with said output gear.

27. A system according to claim 23, wherein said valve is a ball valve.

28. A system according to claim 23, said actuator further comprising a spring disposed between said output gear and said output shaft structure, said spring being configured to deflect for permitting said relative motion upon application of said predetermined level of force.

29. A system according to claim 23, wherein said conductive path comprises at least one output gear contact coupled to said output gear, said output gear contact being normally electrically connected to at least one output shaft contact coupled to said output shaft structure, said output gear contact and said output shaft contact being configured to disengage from each other in response to said relative motion to thereby open said electrical path.

30. A system according to claim 29, wherein said actuator further comprises at least one stationary contact for engaging said output shaft contact in a range of motion of said output shaft structure.

31. A system according to claim 30, wherein movement of said output shaft contact beyond an end of said at least one stationary contact opens said conductive path to define a limit to said range of motion.

32. A system according to claim 29, wherein said actuator comprises a first stationary contact for engaging a first one of said output shaft contacts in a first direction of rotation of said output shaft, and a second stationary contact for engaging a second one of said output shaft contacts in a second direction of rotation of said output shaft, and wherein movement of said first output shaft contact beyond an end of said first stationary contact opens said conductive path to define a limit of rotation of said output shaft in said first direction, and wherein movement of said second output shaft contact beyond an end of said second stationary contact opens said conductive path to define a limit of rotation of said output shaft in said second direction.

33. A system according to claim 23, wherein said conductive path comprises at least one cam contact and at least one output shaft contact coupled to said output shaft structure, and wherein said output gear comprises at least one cam for depressing cam contact onto said output shaft contact, said cam being configured to release said cam contact from engagement with said output shaft contact in response to said relative motion to thereby open said electrical path.

34. A system according to claim 33, wherein said actuator further comprises at least one stationary contact for engaging said output shaft contact in a range of motion of said output shaft structure.

35. A system according to claim 34, wherein movement of said output shaft contact beyond an end of said at least one stationary contact opens said conductive path to define a limit to said range of motion.

36. A system according to claim 33, wherein said actuator comprises a first stationary contact for engaging a first one of said output shaft contacts in a first direction of rotation of said output shaft, and a second stationary contact for engaging a second one of said output shaft contacts in a second direction of rotation of said output shaft, and wherein movement of said first output shaft contact beyond an end of said first stationary contact opens said conductive path to define a limit of rotation of said output shaft in said first direction, and wherein movement of said second output shaft contact beyond an end of said second stationary contact opens said conductive path to define a limit of rotation of said output shaft in said second direction.

37. A system according to claim 23, said actuator further comprising a housing, said housing comprising a top portion disposed at least partially within a cap portion and rotatable relative to said cap portion, wherein said motor, said output gear, and said output shaft are coupled to said top portion for rotation upon manual rotation of said top portion relative to said cap portion.

38. A method of providing pinch protection in a movable mechanism, said method comprising:

coupling said mechanism to an output shaft structure, said output shaft structure being coupled to an output gear with a spring disposed between said output gear and said output shaft structure, said spring being configured to deflect for allowing relative motion between said output gear and said output shaft structure upon application of a predetermined level of force to said output shaft structure, said output shaft structure and said output gear establishing a conductive path to a motor for driving said output shaft structure through said output gear, said conductive path being configured to open in response to said relative motion; and energizing said motor to drive said mechanism.

* * * * *